United States Patent
Vasseur et al.

(10) Patent No.: US 9,077,615 B2
(45) Date of Patent: Jul. 7, 2015

(54) GLOBAL STATE RESYNCHRONIZATION FOR PATH COMPUTATION ELEMENT FAILURE DURING A REOPTIMIZATION PROCESS

(75) Inventors: Jean-Philippe Vasseur, Saint Martin d'Uriage (FR); Stefano Previdi, Rome (IT); David Ward, Los Gatos, CA (US); George Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 118 days.

(21) Appl. No.: 13/524,632

(22) Filed: Jun. 15, 2012

(65) Prior Publication Data

US 2013/0336108 A1    Dec. 19, 2013

(51) Int. Cl.

| | |
|---|---|
| *H04L 1/02* | (2006.01) |
| *H04J 3/14* | (2006.01) |
| *H04L 12/24* | (2006.01) |
| *H04L 12/46* | (2006.01) |
| *H04L 12/751* | (2013.01) |
| *H04L 12/707* | (2013.01) |
| *H04L 12/703* | (2013.01) |
| *H04L 12/717* | (2013.01) |
| *H04L 12/723* | (2013.01) |
| *H04L 12/26* | (2006.01) |

(52) U.S. Cl.
CPC .............. *H04L 41/0663* (2013.01); *H04L 43/10* (2013.01); *H04L 12/4633* (2013.01); *H04L 45/02* (2013.01); *H04L 45/22* (2013.01); *H04L 45/28* (2013.01); *H04L 45/42* (2013.01); *H04L 45/50* (2013.01)

(58) Field of Classification Search
USPC ................. 370/216, 400, 409, 431, 445, 455, 370/225–229, 230–238; 455/401, 458
See application file for complete search history.

(56) References Cited

U.S. PATENT DOCUMENTS

| | | | |
|---|---|---|---|
| 7,031,262 B2 | 4/2006 | Vasseur et al. | |
| 7,551,569 B2 * | 6/2009 | Vasseur | 370/252 |
| 7,660,254 B2 * | 2/2010 | Vasseur et al. | 370/237 |

(Continued)

FOREIGN PATENT DOCUMENTS

EP     2549703 A1     1/2013

OTHER PUBLICATIONS

Cipolla, et al., "Notification of Transmittal of the International Search Report and the Written Opinion of the International Searching Authority, or the Declaration", Patent Cooperation Treaty, International Application No. PCT/US2013/045905, mailed Oct. 16, 2013, 12 pages, European Patent Office, Rijswijk, Netherlands.

(Continued)

*Primary Examiner* — Edan Orgad
*Assistant Examiner* — Sithu Ko
(74) *Attorney, Agent, or Firm* — Parker Ibrahim & Berg LLC; James M. Behmke; Stephen D. LeBarron

(57) ABSTRACT

In one embodiment, a router initiates reroutes of one or more tunnels at the router as part of optimization of a plurality of tunnels in a computer network, and stores an original state of the one or more tunnels at the router prior to the optimization. By detecting whether path computation element (PCE) failure occurs prior to completion of the optimization, the router may revert to the original state of the one or more tunnels in response to PCE failure prior to completion of the optimization.

18 Claims, 13 Drawing Sheets

(56) References Cited

U.S. PATENT DOCUMENTS

| | | |
|---|---|---|
| 7,668,971 B2 | 2/2010 | Vasseur et al. |
| 7,675,860 B2 | 3/2010 | Vasseur et al. |
| 7,693,055 B2 | 4/2010 | Vasseur et al. |
| 7,886,079 B2 | 2/2011 | Vasseur et al. |
| 8,072,879 B2 | 12/2011 | Vasseur et al. |
| 8,369,213 B2 | 2/2013 | Vasseur et al. |
| 2006/0056303 A1 | 3/2006 | Aggarwal et al. |
| 2006/0182035 A1* | 8/2006 | Vasseur .................... 370/238 |
| 2008/0151756 A1 | 6/2008 | Vasseur et al. |
| 2011/0205885 A1* | 8/2011 | Kini et al. ................ 370/217 |

OTHER PUBLICATIONS

Lee, et al., "Path Computation Element Communication Protocol (PCEP) Requirements and Protocol Extensions in Support of Global Concurrent Optimization", Network Working Group, Request for Comments 5557, Jul. 2009, 26 pages, Internet Engeering Task Force Trust.

Crabbe, et al., "PCEP Extensions for Stateful PCE", IETF Trust, Network Working Group, Internet Draft, draft-ietf-pce-stateful-pce-00, Feb. 2012, 52 pages.

Farrel, et al., "A Path Computation Element (PCE)-Based Architecture", The Internet Society, Network Working Group, Request for Comments 4655, Aug. 2006, 41 pages.

Pan, et al., "Fast Reroute Extensions to RSVP-TE for LSP Tunnels", The Internet Society, Network Working Group, Request for Comments 4090, May 2005, 39 pages.

Vasseur, et al., "Path Computation Element (PCE) Communication Protocol (PCEP)", IETF Trust, Network Working Group, Request for Comments 5440, Mar. 2009, 87 pages.

* cited by examiner

GLOBAL STATE RESYNCHRONIZATION FOR PATH COMPUTATION ELEMENT FAILURE DURING A REOPTIMIZATION PROCESS

TECHNICAL FIELD

The present disclosure relates generally to computer networks, and, more particularly, to path computation elements (PCEs).

BACKGROUND

Tunnels have been used for a number of applications such as the support of virtual private networks (VPNs) or Traffic Engineering following source routed paths hop-by-hop. Among the number of tunneling techniques developed over the past decade, multiprotocol label switching (MPLS) Traffic Engineering (TE) has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure.

Path computation elements (PCEs), as defined, for example, in the Internet Engineering Task Force's Request for Comment (RFC) 4655, generally consist of relying on an external engine (PCE) responsible for the computation of tunnels in the network. Head-ends (or Path Computation Clients—PCCs) send requests to PCEs (PCReq messages) using the PCEP signaling protocol (RFC 5440), and receive computed paths thanks to replies (PCRep messages). PCEP also specifies notification and error messages. PCEs have been used mostly for back-up tunnel path computation and inter-domain (Inter-area/AS) path computations where per-domain path computation was the only (potentially very sub-optimal) technique available prior to the PCE.

PCE-based networks deployed so far have been stateless. That is, tunnels were computed by the PCE according to the Traffic Engineering Database (TED) fed in most cases by the routing protocol without requiring any state maintenance. However, for certain applications, stateful PCE may provide a more optimal solution. A new stateful PCE draft has been adopted as an IETF Working Document, entitled "PCEP Extensions for Stateful PCE"<draft-ietf-pce-stateful-pce> by Crabbe et al., and which specifies several new PCEP messages, allowing PCCs to update the PCE on their tunnel states (PCRpt messages), control tunnel delegation (ability for the PCE to remotely control a tunnel) and for the PCE to send tunnel requests to PCCs to learn states (PCUpd messages). Stateful PCE architectures, however, still present a number of challenges of various natures.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a router initiates reroutes of one or more tunnels at the router as part of optimization of a plurality of tunnels in a computer network, and stores an original state of the one or more tunnels at the router prior to the optimization. By detecting whether path computation element (PCE) failure occurs prior to completion of the optimization, the router may revert to the original state of the one or more tunnels in response to PCE failure prior to completion of the optimization.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a router used to interconnect multiple domains is generally referred to as a "border router" or BR. In the case of areas rather than ASes since the routers are under a common authority, a single router may in fact serve as an exit border router of one area and an entry border router of another area.

Figure 1A:
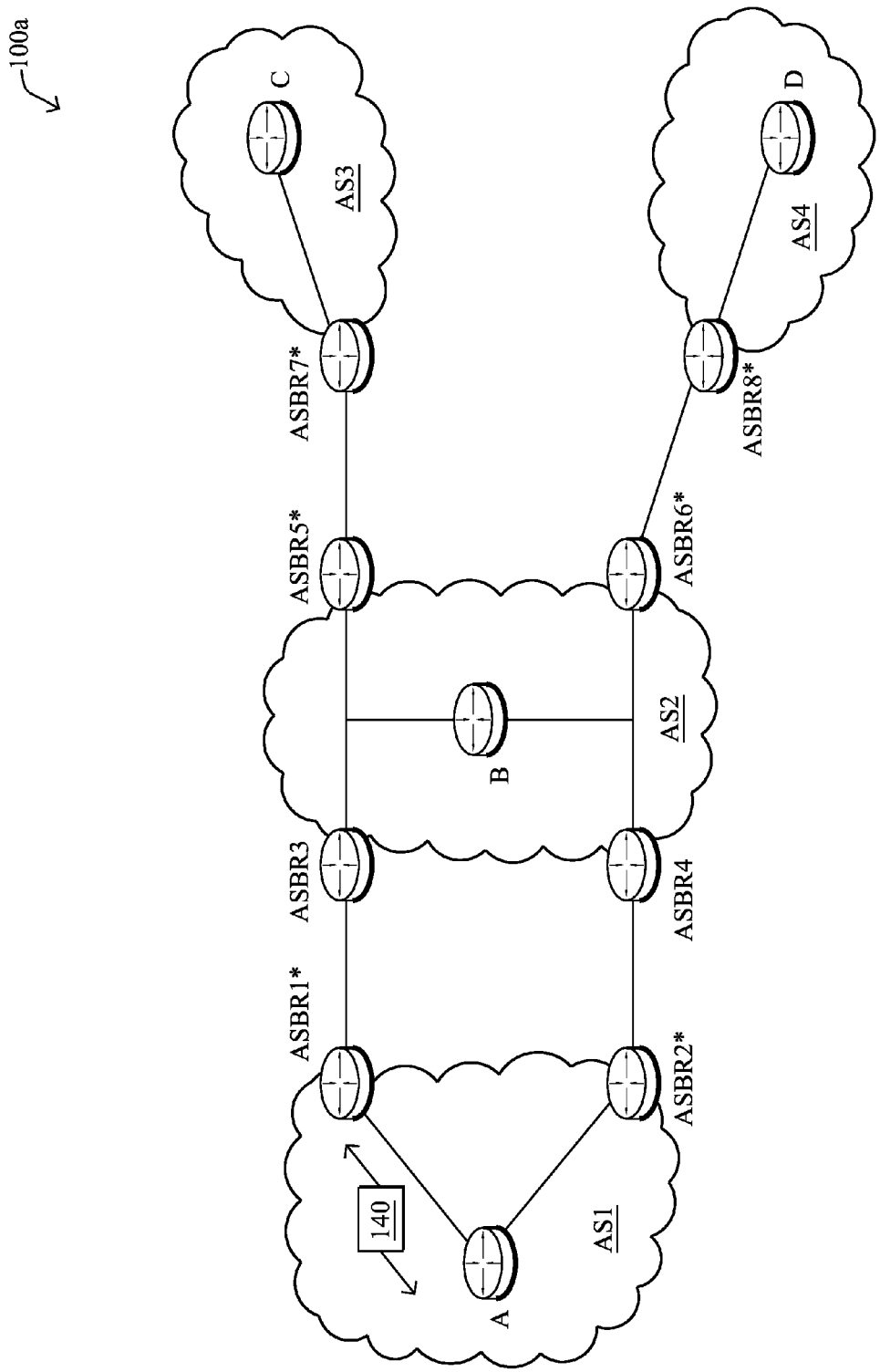
FIGS. 1A-1B illustrate example computer networks.

FIG. 1A is a schematic block diagram of an exemplary computer network 100a comprising autonomous system AS2, which is interconnected with a plurality of other autonomous systems AS1, AS3, and AS4. An Autonomous System (AS) is herein defined to be a group of intermediate nodes, such as intradomain routers, within a network that are subject to a common authority and execute one or more intradomain routing protocols. Although, each AS is illustratively an autonomous system, those skilled in the art will appreciate that the ASes may alternatively be configured as routing domains or other networks or subnetworks. The autonomous system AS1 includes intradomain routers such as border routers ASBR1* and ASBR2* through which communication, such as data packets, may pass into and out of the autonomous system to border routers ASBR3 and ASBR4, respectively of AS2. AS2 also includes border routers ASBR5* and ASBR6* in communication with border routers ASBR7* and ASBR8* of ASes 3 and 4, respectively. Moreover, within AS1, AS2, AS3, and AS4, there are exemplary intradomain routers A, B, C, and D, respectively.

Figure 1B:
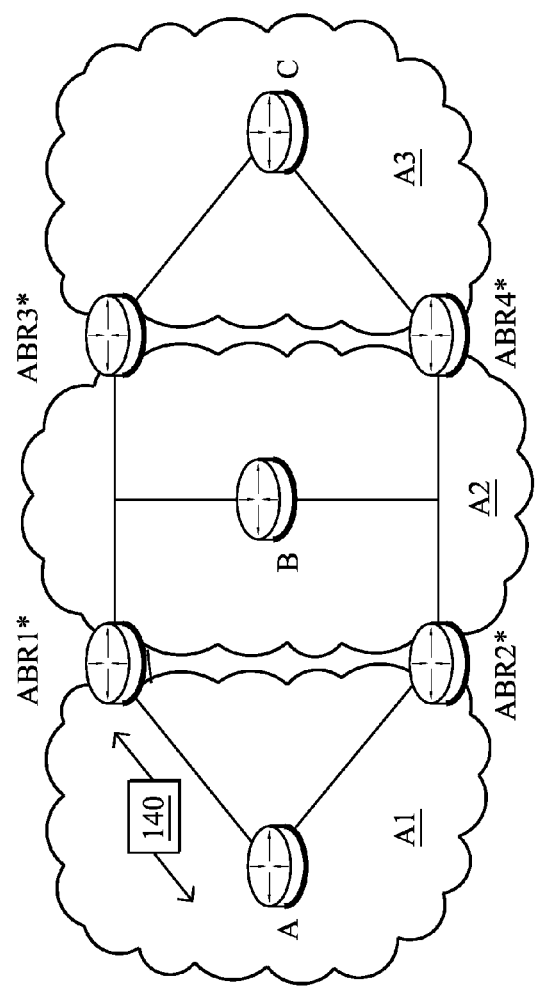

Alternatively or in addition, FIG. 1B is a schematic block diagram of an exemplary computer network 100b comprising areas A1, A2, and A3, each having at least one intradomain router, A, B, and C, respectively. In particular, A1 and A2 share border routers ABR1* and ABR2*, while A2 and A3 share ABR3* and ABR4. As used herein, an area is a collection of routers that share full network topology information with each other but not necessarily with routers outside the area. The term area as used herein also encompasses the term "level" which has a similar meaning for networks based on their chosen routing protocol.

Data packets 140 (e.g., discrete frames or packets of data) may be exchanged among the nodes/devices of the computer network 100 (100a and 100b, generically) using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In this context, a protocol consists of a set of rules defining how the nodes interact with each other. For example, in addition to user data, routing information may be distributed among the routers within an AS (e.g., between areas A1-A3) using pre-determined "interior" gateway protocols (IGPs), such as conventional distance-vector protocols or, illustratively, link-state protocols, through the use of link-state advertisements (LSAs) or link-state packets. Moreover, data packets containing network routing information may be exchanged among the autonomous systems AS1-AS4 using "external" gateway protocols, such as the Border Gateway Protocol (BGP).

Those skilled in the art will understand that any number of nodes, devices, links, etc. may be used in the computer network, and that the view shown herein is for simplicity. Furthermore, the techniques described below with reference to inter-AS path computation may be used in the context of inter-area path computation and, under certain conditions, the techniques described with reference to inter-area path computation may be used for inter-AS path computation.

Figure 2:
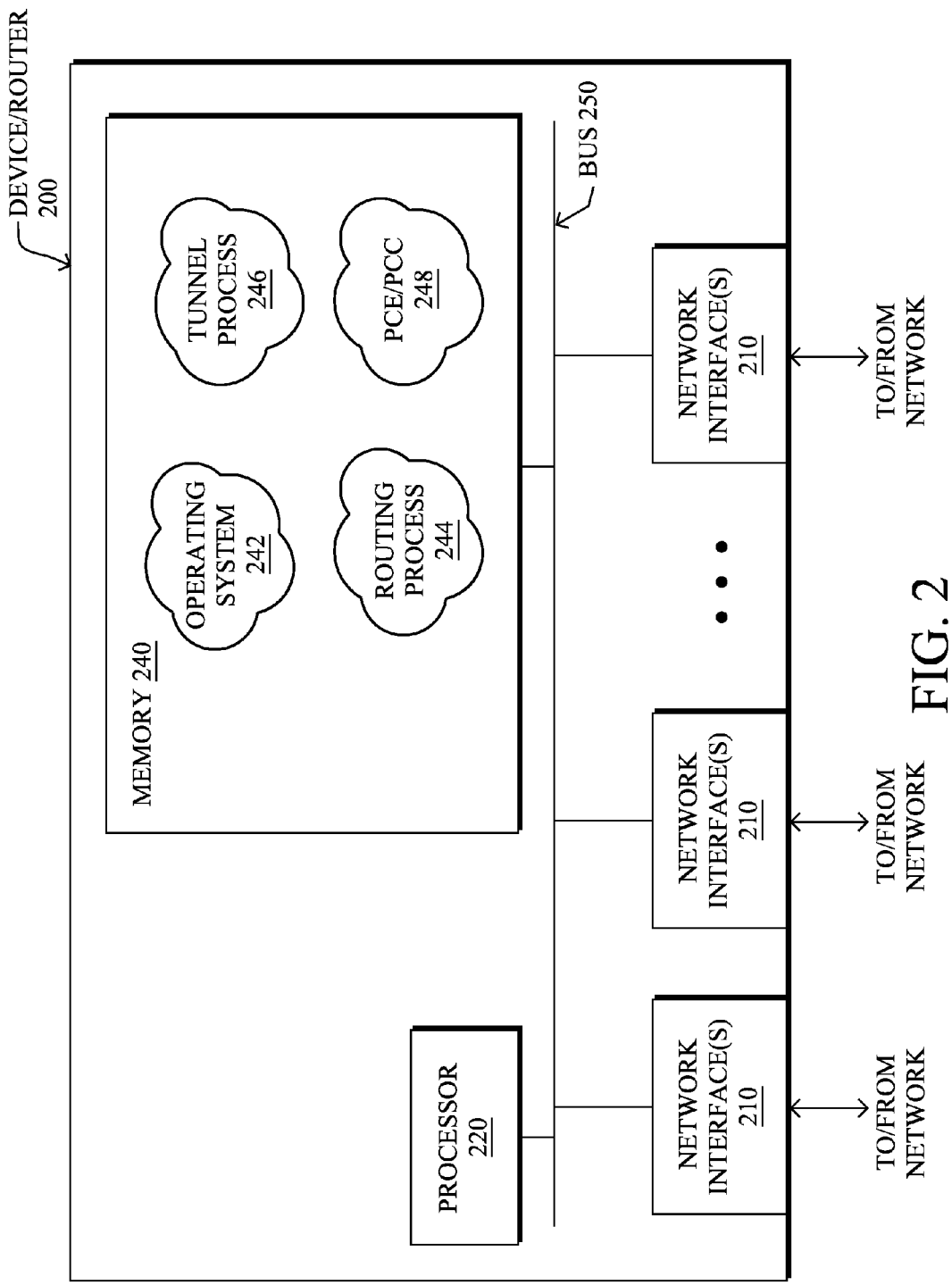
FIG. 2 illustrates an example network device/node.

FIG. 2 is a schematic block diagram of an example node/device (e.g., router) 200 that may be used with one or more embodiments described herein, e.g., as any of the devices in FIGS. 1A and 1B above, particularly as a path computation element or client (PCE or PCC) described herein. The device may comprise one or more network interfaces 210, at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as routing databases/link state databases (LSDBs)/Traffic Engineering databases (TEDs) and or tables. An operating system 242, portions of which are typically resident in memory 240 and executed by the processor, functionally organizes the device by, among other things, invoking operations in support of software processes and/or services executing on the device. These software processes and/or services may comprise routing process/services 244, tunneling process/services 246, and an illustrative PCE/PCC process 248, as described herein. Note that while the processes are shown in centralized memory 240, alternative embodiments provide for certain aspects of the techniques herein to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables (data structures 245) containing, e.g., data used to make routing and forwarding decisions. Notably, routing services 244 may also perform functions related to virtual routing protocols, such as maintaining virtual routing/forwarding (VRF) instances (illustratively a component of tables 245) as will be understood by those skilled in the art.

Changes in the network topology within the local domain (network 100) may be communicated among nodes/routers 200 within the network 100 using routing services 244, for example, IGP services such as the conventional OSPF and IS-IS link-state protocols. Suppose, for example, that a communication link fails or a cost value associated with a network node changes. Once the change in the network's state is detected by one of the routers, that router may flood an IGP (or BGP) advertisement (message/packet 140) communicating the change to the other routers in the network. In this manner, each of the routers eventually "converges" to an identical view of the network topology.

Multi-Protocol Label Switching (MPLS) is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (data structure 245) stores the FEC, the next-hop information for the LSP, and the label required by the next hop.

Also, MPLS Traffic Engineering (TE) has been developed to meet data networking requirements such as guaranteed available bandwidth or fast reroute (FRR). MPLS TE exploits modern label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, among others, the Layer Two Tunnel Protocol (L2TP), the Point-to-Point Tunneling Protocol (PPTP), IP tunnels, and generic routing encapsulation (GRE) tunnels.

In particular, establishment of a tunnel (e.g., TE-LSP) requires computation of a path between a head-end node (LSR) to a tail-end node, signaling along the path (e.g., through resource reservation protocol (RSVP)-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. In addition, a number of techniques have been developed to allow for dynamic bandwidth adjustment of the signaled bandwidth using RSVP-TE, the allocation of dynamic preemptions so as to mitigate the probability of dead-lock due to bin-packing issues or bandwidth fragmentation, distributed re-optimization techniques to defragment bandwidth in the network, distributed techniques for backup tunnel computation maximizing back-up bandwidth usage according to the assumption of single link/node/SRLG resources (bandwidth sharing between independent resources), etc.

Occasionally, a network element (e.g., a node or link) will fail, causing redirection of the traffic that originally traversed the failed network element to other network elements that bypass the failure. Generally, notice of this failure is relayed to the nodes in the network through an advertisement of the new network topology, e.g., an IGP or BGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, such as Fast Reroute, e.g., MPLS TE Fast Reroute (RFC4090).

Fast Reroute (FRR) has been widely deployed to protect against network element failures, where "backup tunnels" are created to bypass one or more protected network elements (e.g., links, shared risk link groups (SRLGs), and nodes). When the network element fails, traffic is quickly diverted ("Fast Rerouted") over a backup tunnel to bypass the failed element, or more particularly, in the case of MPLS, a set of primary TE-LSPs (tunnels) is quickly diverted. Specifically, the point of local repair (PLR) node configured to reroute the traffic inserts ("pushes") a new label for the backup tunnel, and the traffic is diverted accordingly. Once the failed element is bypassed, the backup tunnel label is removed ("popped") by the last LSR along the backup path, and the traffic is routed along the original path according to the next label (e.g., that of the original TE-LSP). Notably, the backup tunnel, in addition to bypassing the failed element along a protected primary TE-LSP, also intersects the primary TE-LSP, i.e., it begins and ends at nodes along the protected primary TE-LSP.

As noted above, tunnels have been used for a number of applications such as the support of virtual private networks (VPNs) or Traffic Engineering following source routed paths hop-by-hop. Among the number of tunneling techniques developed over the past decade, MPLS TE has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure. MPLS TE-LSPs, for example, were originally computed using distributed constrained shortest path first (CSPF) algorithms where each tunnel head-end was responsible for the computation of the LSP path in the network, using a constrained SPF (e.g., Dijsktra) according to the Traffic Engineering Database (TED) distributed by a link state routing protocol such as OSPF or IS-IS.

A series of challenging problems arose that required the use of a new path computation model known as the Path Computation Element (PCE) model, such as defined in RFC4655. The PCE model generally consists of relying on an external engine (PCE) responsible for the computation of tunnels in the network. Head-ends (or Path Computation Clients—PCCs) send requests to PCEs (PCReq messages) using the PCEP signaling protocol (RFC5440), and receive computed paths thanks to replies (PCRep messages). PCEs have been used mostly for back-up tunnel path computation and inter-domain (Inter-area/AS) path computations where per-domain path computation was the only (potentially very sub-optimal) technique available prior to the PCE.

In particular, the PCE is an entity having the capability to compute paths between any nodes of which the PCE is aware in an AS or area (domain). (PCE process/services 248 contain computer executable instructions executed by processor 220 to perform functions related to PCEs in general, and in accordance with one or more embodiments described herein.) PCEs are especially useful in that they are more cognizant of network traffic and path selection within their AS or area, and thus may be used for more optimal path computation. A head-end node/LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement") carried within a routing protocol message, which is sent from the PCE within its area or level or across the entire AS to advertise its services.

Generally, PCE functions are hosted on a BR between domains for inter-domain path computation, and there are typically at least two BRs, so there is no single point of failure. For example, ASBRs and ABRs tagged with an asterisk (*) in FIGS. 1A and 1B may be configured as PCEs. Note that while illustratively PCE functions are generally hosted on a BR, the techniques described herein are equally applicable to PCEs not hosted on a BR, accordingly.

Figure 3A:
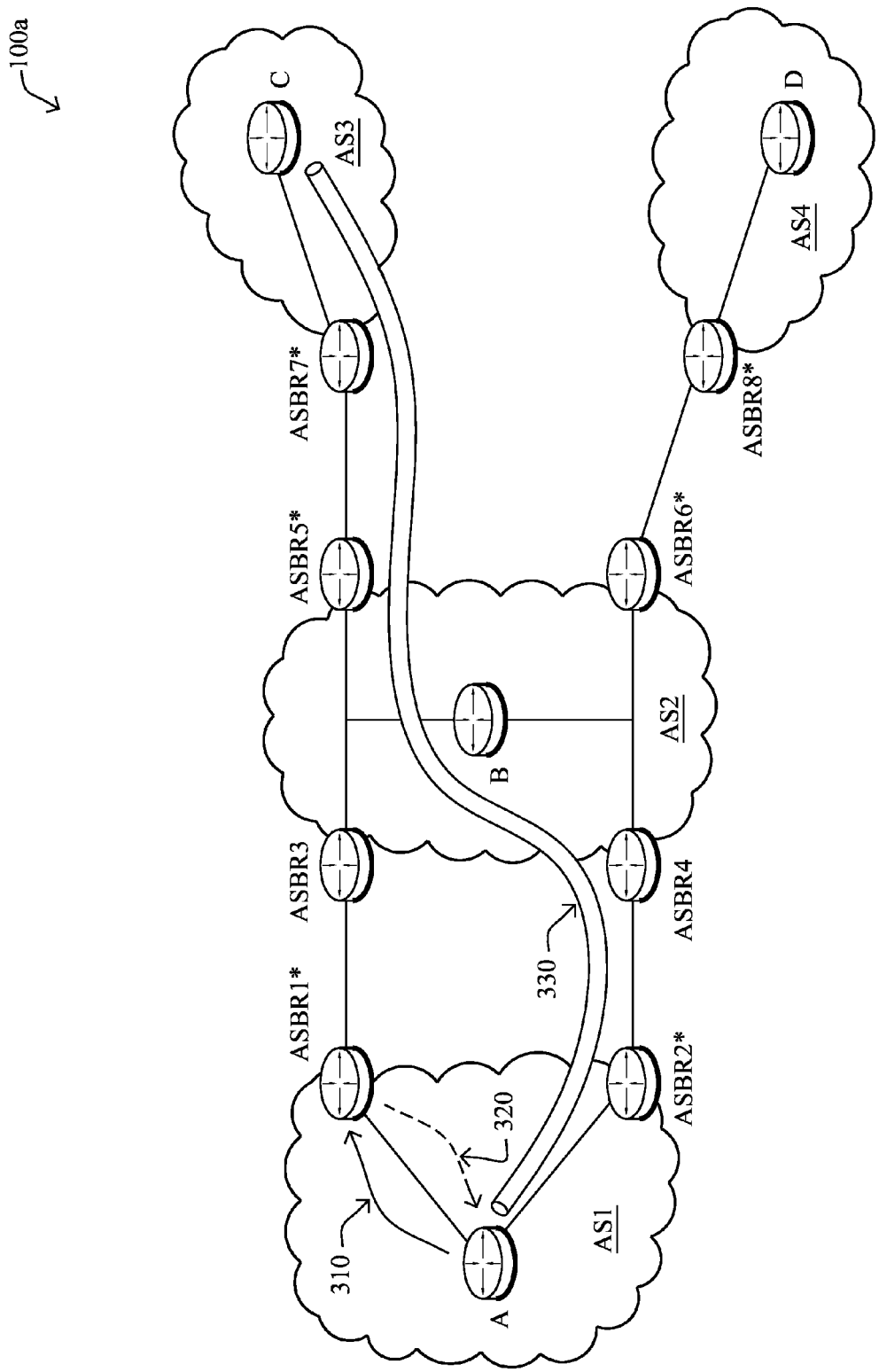
FIGS. 3A-3B illustrate examples of PCE-based tunnel computation in the networks of FIGS. 1A-1B.
Figure 3B:
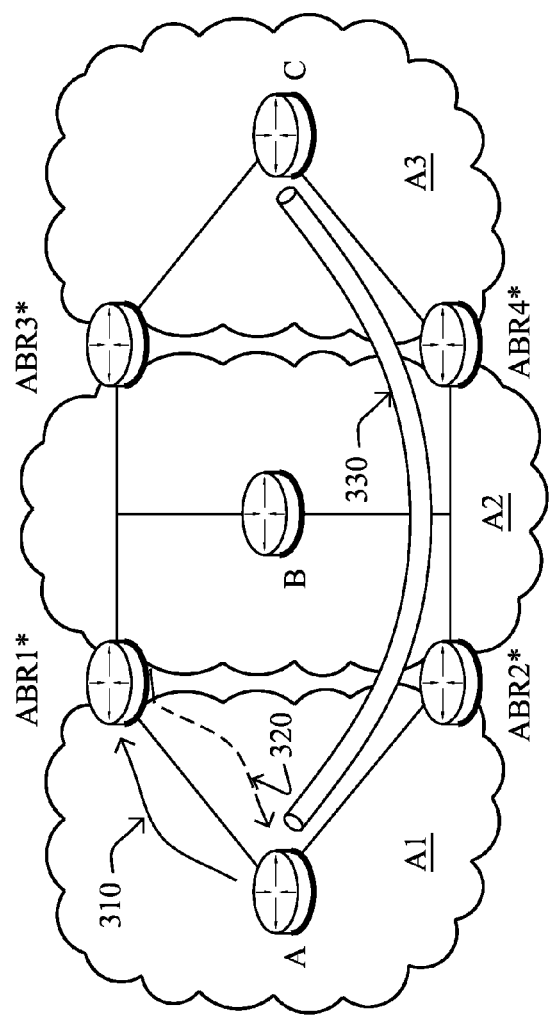

FIGS. 3A-3B illustrate simple examples of PCE-based tunnel computation in the networks 100a and 100b of FIGS. 1A-1B, respectively. In particular, assume in each instance that LSR A, acting as a PCC, requests, from a local PCE (e.g., ASBR1* or ABR1*, respectively), a tunnel to LSR C. The path computation request 310 results in computation of the path, and a path computation response 320 is returned to the head-end LSR A. The tunnel 330 may then be established, accordingly. (Note that for inter-domain computation, the local PCE may act as a PCC to other PCEs in other domains, as mentioned above.) Note further that while PCEs are particularly useful for inter-domain path computation, the techniques herein are not limited to inter-domain path computation, and may, in fact, be used for intra-domain path computation as well.

In PCE-based networks deployed so far, PCEs have been stateless: LSPs were computed by the PCE according to the Traffic Engineering Database (TED) fed in most cases by the routing protocol (ISIS or OSPF, more recently potentially using BGP) without requiring any state maintenance. Although the PCE architecture did refer to the potential use of stateful PCEs as a potentially more optimal model that would keep track of all LSPs states in the network when computing LSPs, the model was seen to be quite complex in terms of signaling, states maintenance, etc. with a number of very challenging issues.

It became apparent that stateful PCE was the solution of choice for several applications such as inter-layer optimizations or global optimization, but only recently did the number of use cases grow significantly considering increased requirements for advanced optimization of bandwidth resources. To that end, stateful PCEs have been implemented, and a stateful PCE draft standard was adopted as the IETF Working Document mentioned above entitled "PCEP Extensions for Stateful PCE", which specifies several new PCEP messages, allowing PCC to update the PCE on their LSP states (PCRpt messages), control LSP delegation (ability for the PCE to remotely control an LSP) and for the PCE to send LSP requests to PCC to learn states (PCUpd messages). As defined in the above document, a function can be initiated either from a PCC towards a PCE (C-E) or from a PCE towards a PCC (E-C). The new functions are:

Capability negotiation (E-C,C-E): Both the PCC and the PCE must announce during PCEP session establishment that they support PCEP Stateful PCE extensions defined in this document;

LSP state synchronization (C-E): After the session between the PCC and a stateful PCE is initialized, the PCE must learn the state of a PCC's LSPs before it can perform path computations or update LSP attributes in a PCC;

LSP Update Request (E-C): A PCE requests modification of attributes on a PCC's LSP;

LSP State Report (C-E): A PCC sends an LSP state report to a PCE whenever the state of an LSP changes; and LSP control delegation (C-E,E-C): A PCC grants to a PCE the right to update LSP attributes on one or more LSPs; the PCE becomes the authoritative source of the LSP's attributes as long as the delegation is in effect; the PCC may withdraw the delegation or the PCE may give up the delegation.

Stateful PCEs are slated to play a major role in future tunnel-enabled network architectures. Though the use of stateful PCEs is intended to solve a wide range of problems, they also bring a number of hard technical issues, including, but not limited to:

1) There are a number of situations where a PCE may receive a burst of signaling requests in the network, which is in contrast with the distributed nature of CSPF: when performing global reoptimizations, rerouting a large number of LSPs upon a link/node failure (in some networks, a single failure may lead to tens of thousands of LSP failures).

2) State maintenance is another critical issue. Stateful PCEs are required to maintain LSP states. When recomputing an LSP, this may first require displacing other LSPs in the network, leading to a very large number of signaling exchanges in the network.

3) Scaling of the overall architecture: attempts have been made to scale the stateful PCE architecture by distributing computation among several PCEs and allowing for inter-PCE communication when performing parallel computations of LSPs. These models have shown very limited scaling due to the number of signaling exchanges between PCEs (similar to IPCs between CPU in massive parallel computing issues).

4) PCE failure during operation of maintenance, which is not an issue when the PCE is stateless. Unfortunately, the issue is significantly more complex when the PCE fails during a maintenance operation (for example, when some LSPs have been updated and the PCE fails before reaching other head-ends and notifying them of an LSP path change that is required for the other LSPs to be routed in the network), thus leaving the network in a very unstable/unknown state.

One fundamental limiting factor of stateful PCE architectures lies in the basic lack of scalability, similarly to any other types of centralized architecture. Most often, this lack of scalability has resulted in abandoning a centralized architecture in favor of less-optimal distributed path computation architectures (e.g., using distributed CSPF on each head-end). Scalability can be determined according to a number of dimensions: ability to handle a large number of path computation requests, ability to compute and serve these requests in real-time (response time), capacity storage of all required states (e.g., network resources reservations, number of TE LSPs), etc.

In addition to scalability, the stateful architecture having been challenged for its "single point of failure" weakness. For example, should the primary PCE fail, redirecting requests to a backup PCE that would require a "cold-start" is a heavy, slow, and expensive process.

One major challenge with stateful PCE relates to the number of sequence events that occur when reoptimizing the whole set of TE LSPs. Indeed, experience in the past showed that it is quite frequent for a stateful PCE to first have to displace a set of established TE LSPs in order to satisfy a new request. Algorithms and heuristics have been designed in order to minimize the number of TE LSPs to be displaced in order to satisfy a new request. Similarly heuristics exist to find the best compromise in order to minimize the number of TE LSPs to displace (which is always an issue because of the signaling churn but also the jitter experienced by traffic during TE LSP reroute) while trying to globally reoptimize the set of TE LSP to meet certain criteria such as an objective function (e.g., minimizing the maximum load of any link in the network, etc.).

Displacing TE LSPs in a network may require a number of complex steps: first, the set of head-end (PCC) having at least one TE LSP to reroute is identified, then in most cases existing TE LSPs must be re-signaled with 0-bandwidth (to avoid a dead-lock issue), and finally each LSR having at least one TE LSP to reroute must start rerouting along the new path with 0-bandwidth and finally re-signal with the new bandwidth. One major issue with this, however, is to handle the case of a PCE failure (or communication failure) during the process of communicating the set paths for each rerouted TE LSP.

Global State Resynchronization

The techniques herein manage PCE failure during re-optimization by acquiring a global confirmation upon the successful completion of tunnel make-before-break reroutes by the respective devices, such that in case of failure by the PCE and/or an LSR in the network to complete the operation, the network may return to its previous state (prior to the failure or some intermediate state, thus avoiding a situation where the network is in an unknown state). For instance, the disclosure herein specifies a set of mechanisms and messages in order to efficiently determine whether a reroute operation in a network making use of stateful PCE has succeeded in rerouting of a number of TE LSPs (e.g., in order to satisfy a new request, because of a global reoptimization of the network, or to perform a reroute after a network element failure). In particular, the techniques herein use a fast keep-alive between PCCs and PCEs to detect an issue during the reroute operation, in which case, all routers impacted by the operation (having at least one tunnel to reroute) fall back to a previous state, avoiding having the network left in an unstable incomplete state where only a subset of the tunnels would have been rerouted along their newly computed path.

Specifically, according to one or more embodiments of the disclosure as described in detail below, a router initiates reroutes of one or more tunnels at the router as part of optimization of a plurality of tunnels in a computer network, and stores an original state of the one or more tunnels at the router prior to the optimization. By detecting whether PCE failure occurs prior to completion of the optimization, the router may revert to the original state of the one or more tunnels in response to PCE failure prior to completion of the optimization.

Illustratively, the techniques described herein may be performed by hardware, software, and/or firmware, such as in accordance with the PCE/PCC process 248, which may contain computer executable instructions executed by the processor 220 to perform PCE/PCC functions relating to the techniques described herein (depending upon whether the acting device is a PCE or a PCC), e.g., in conjunction with routing process 244. For example, the techniques herein may be treated as extensions to conventional protocols, such as various PCE/PCC protocols (e.g., stateful PCE/PCC protocols), and as such, may be processed by similar components understood in the art that execute those protocols, accordingly.

Notably, in this instance, a non-PCE/PCC device, e.g., an LSR (router), may also be configured to operate according to an illustrative PCE/PCC process 248, e.g., to perform the techniques in response to a failure of a PCE as described herein.

Figure 4A:
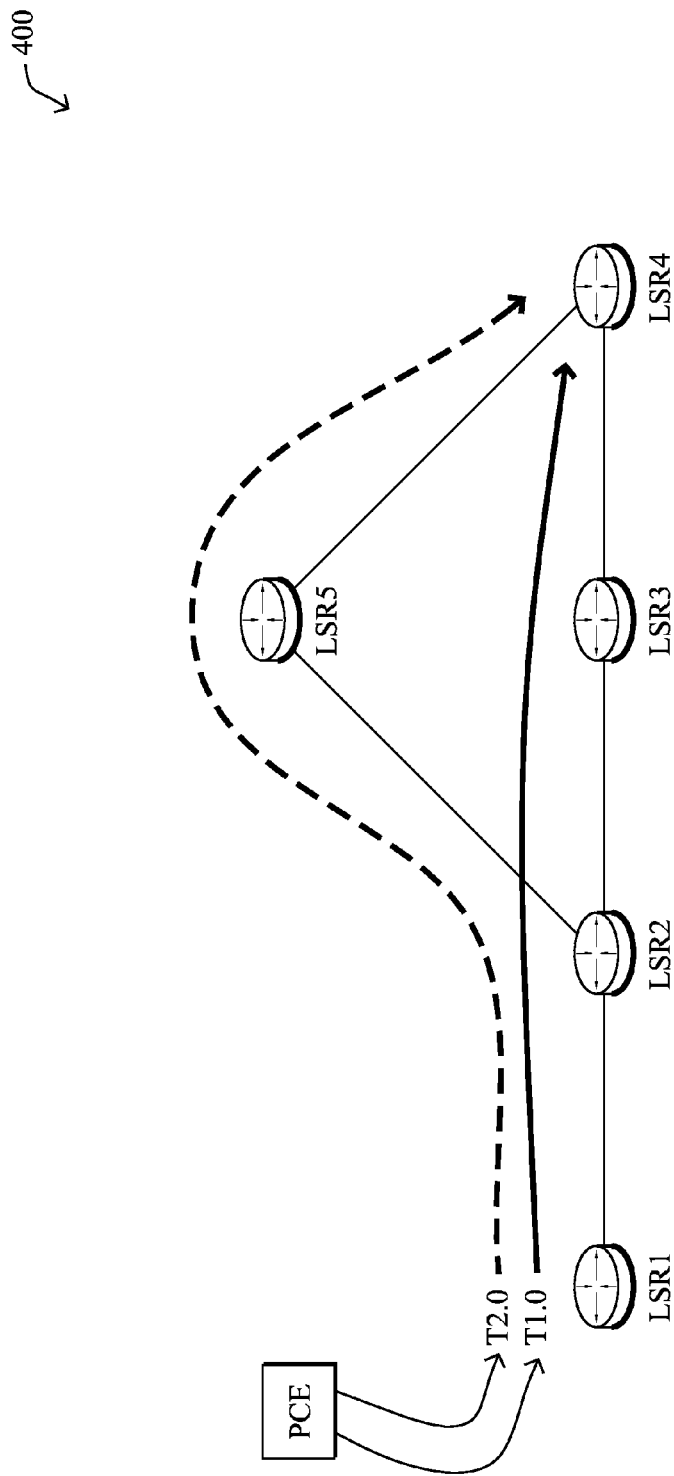
FIGS. 4A-4D illustrate examples of tunnel states during a reoptimization process.

Operationally, for the sake of illustration, assume that at time t=0, the network is in state s=0, all tunnels (e.g., TE LSPs) have been established and the situation is stable. For example, as shown in FIG. 4A, assume that a set of routers (e.g., LSRs 1-5) are maintaining two tunnels "T1" and "T2" as shown, such that at s=0, reference is made to "T1.0" and "T2.0", respectively. At time t=1, an event takes place that requires the stateful PCE (or a set of stateful PCEs, should the requests be balanced among a set of PCEs for load sharing) to compute a set of tunnels (e.g., a subset of all tunnels in the network) thus leading to moving the network to state s=1.

Note that such an event may either be the reception of a new request for a new tunnel requiring displacement of other tunnels to be satisfied, the resizing of a set of tunnels because of aut0-bandwidth, or the rerouting of a set of tunnels because of a link/node/SRG failure in the network, etc. In general, as referred to herein, the transition from one state (e.g., s=0) to another (e.g., s=1) is an optimization process (or reoptimization process), in which routers initiate reroutes of one or more tunnels. In this example, LSR1-LSR5 are the set of LSRs impacted by the optimization event, thus having at least one tunnel that is to be rerouted in order to move the network to state s=1.

According to one component of the techniques herein, an extension (e.g., a new TLV) to the PCEP message (PCRep and PCUpt messages) is specified in order to include the set <LSR1-LSR5>, thus communicating to each "impacted" LSR the set of LSRs impacted by the changes in order to move to the overall state s=1. Upon receiving the newly defined TLV, each LSR in the set records the set of impacted nodes, as well as the current path for each tunnel with a new path in s=1 (called "ERO_old"). In other words, each LSR stores an original state of its rerouted tunnels prior to the optimization (e.g., T1.0 and T2.0).

Figure 4B:
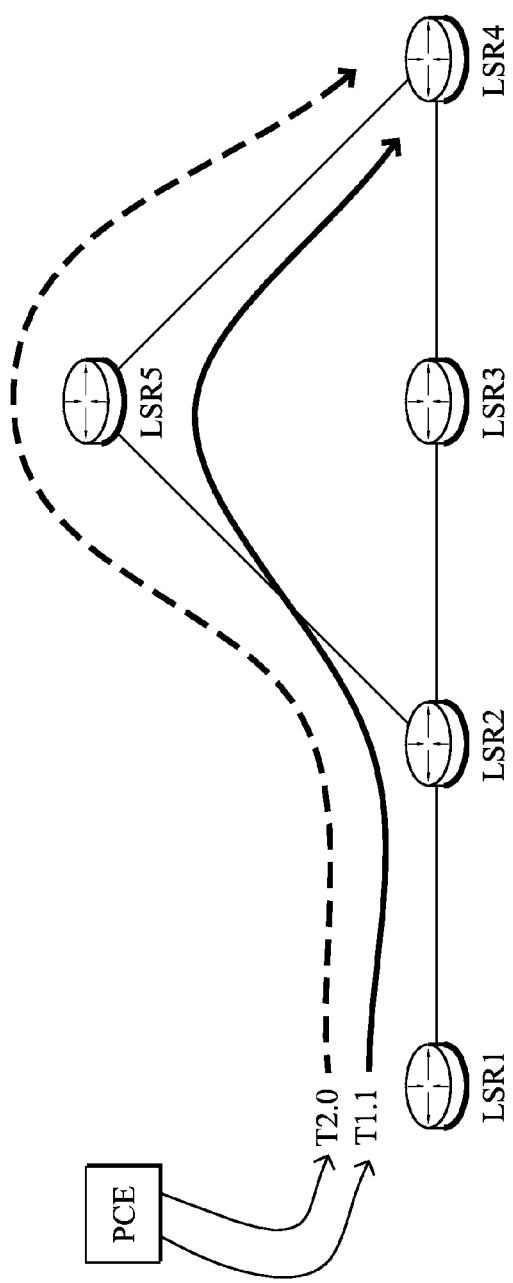
Figure 4C:
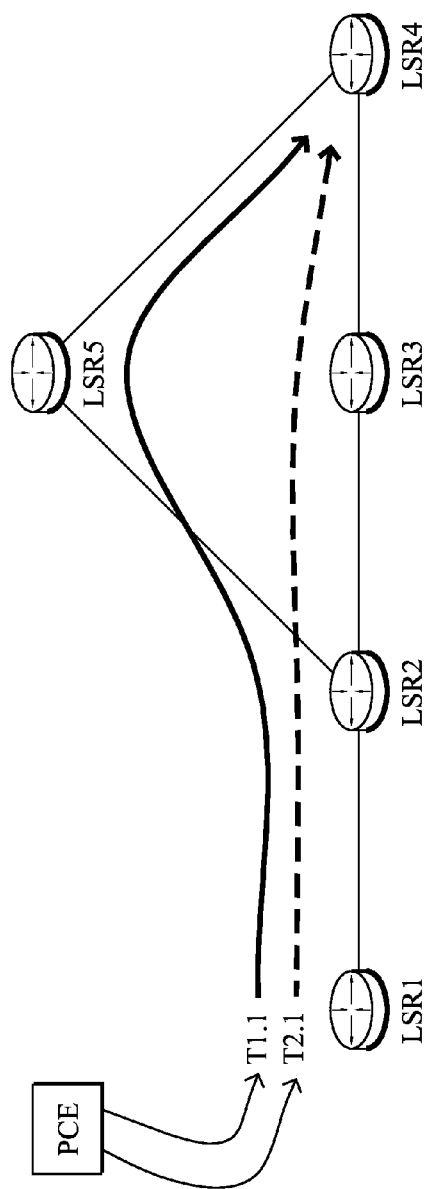

During the optimization process, tunnels within the network may reach various stages of the state-change, such as shown in FIG. 4B. For instance, in FIG. 4B the tunnel T1 has been rerouted, and is now at state T1.1. T2, however, has not yet been rerouted, and remains at step T2.0. The intended end result of the optimization is shown in FIG. 4C, where T2 is also rerouted to T2.1 as shown. Without T2 also being rerouted, the network may be in an unstable state, such as where T1.1 and T2.0 both utilize links LSR2-LSR5 and LSR5-LSR4 (as in FIG. 4B).

Figure 4D:
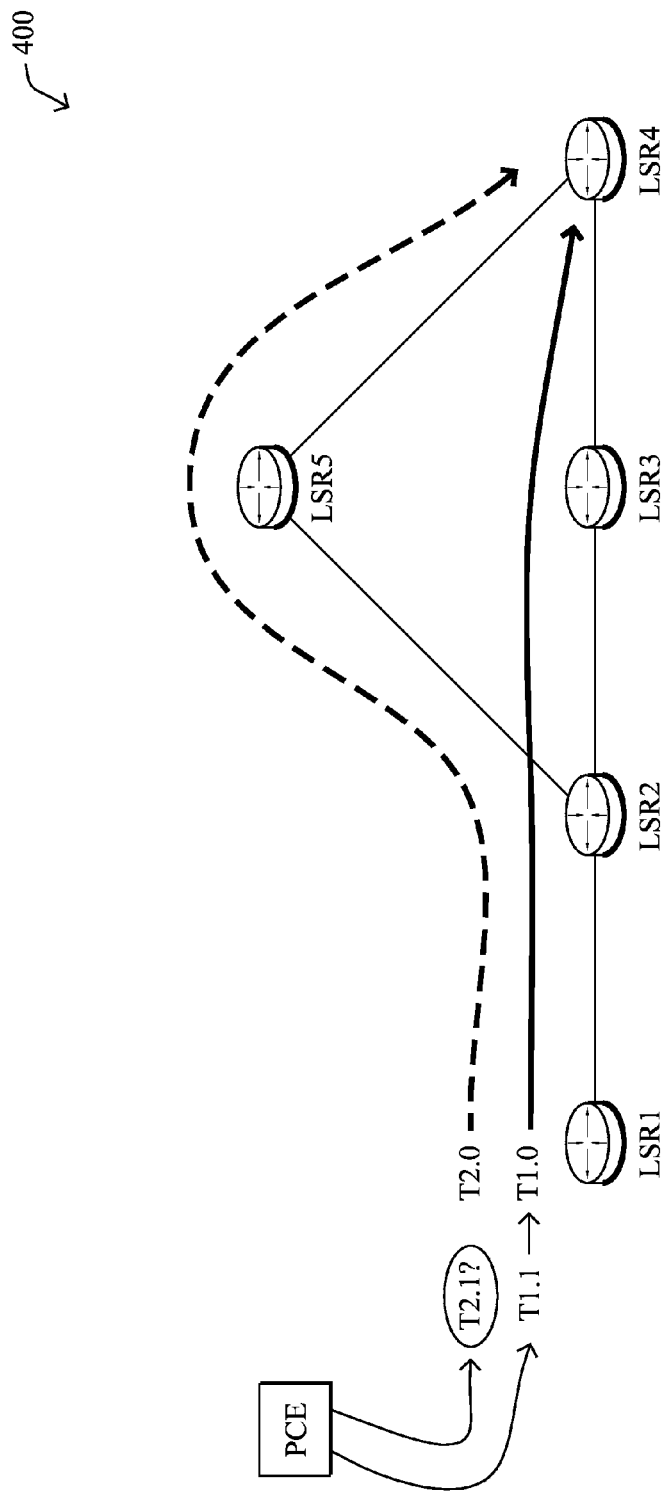

As such, according to the techniques herein, the routers may detect whether PCE failure occurs prior to completion of the optimization, which may be due to one or more routers losing communication the PCE, either because the PCE has crashed/failed, the PCC-PCE communication was lost/failed, the LSR itself encountered an issue and could not complete the operation (i.e., inability to comply with PCE instruction for the reoptimization). In response to PCE failure prior to completion of the optimization, the routers (LSRs) reverting to the original state of their tunnels, i.e., falling back to the old path for each tunnel, thus to state s=0 of the network, as shown in FIG. 4D.

In a first mode of operation, each LSR initiates a timer timer_1 when starting the rerouting process (the optimization), where timer_1 is either statically configured or dynamically computed by the PCE according to the number of LSRs in the set, estimated delays for each tunnel to be rerouted along their new paths, etc. At this point, each LSR starts rerouting its tunnels along the new path provided by the PCE. Note that this operation may potentially be performed in two steps: first signaling with 0-bandwidth to avoid a dead-lock issue, and then signaling the tunnel with the actual bandwidth.

Figure 5:
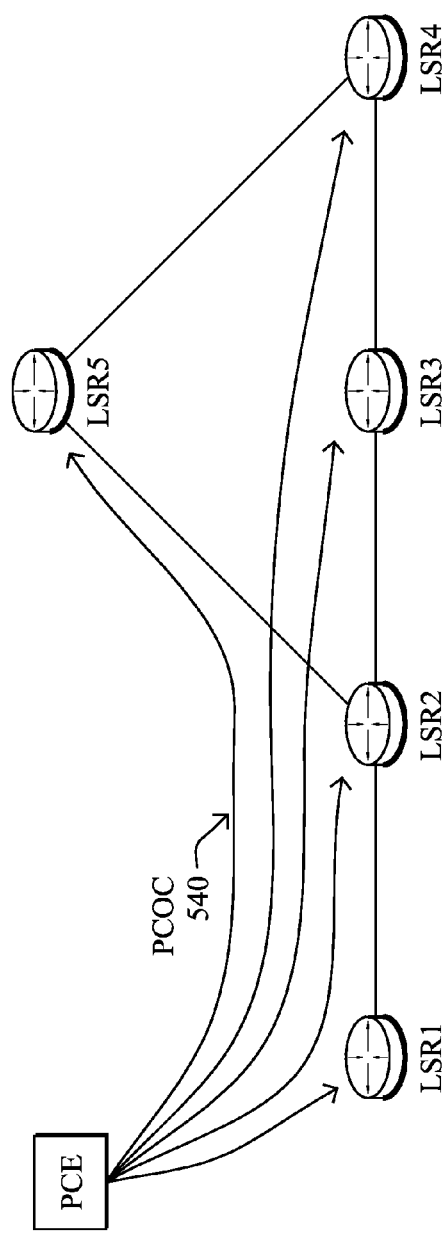
FIG. 5 illustrates an example PCE message exchange.

As each tunnel with a new path has been rerouted in the network, each LSR sends the updated information to the PCE. A new PCEP message is specified herein and illustratively called the PCOC (Path Computation Operation Complete) used by the requesting PCE to indicate to each LSR in the set LSR1-LSR5 that the network has successfully moved to the state s=1 (i.e., all tunnels have been successfully rerouted). As shown in FIG. 5, the PCOC message 540 may be sent to each impacted LSR once the PCE has received a PCRpt for each tunnel successfully rerouted.

If the PCOC message 540 is received prior to the expiration of the timer timer_1, then the LSRs flush ERO_OLD for each rerouted tunnel (i.e., discarding the stored original state once optimization has been confirmed as completed). On the other hand, if the PCOC message is not received prior to the expiration of the timer timer_1 (note that PCEP sessions are generally reliable—using TCP), then at least one of the LSRs in the set could not complete the operation. That is, it can be determined whether the optimization has completed during the timer by determining "PCE failure" (operation failure) upon expiration of the timer timer_1 without having yet determined that optimization has completed.

Figure 6:
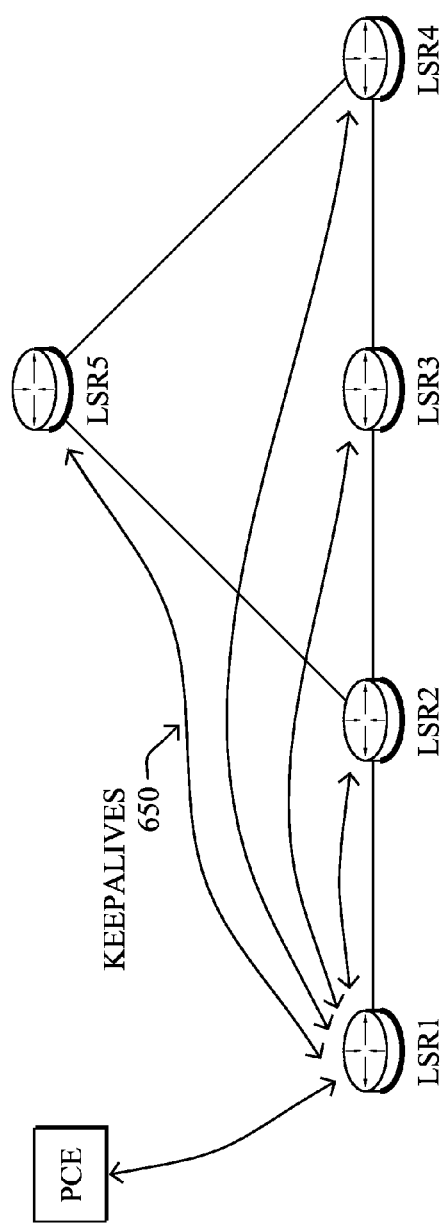
FIG. 6 illustrates an example keepalive protocol.

In a second mode of operation, there are no timers, but the mechanism relies on explicit notifications between the nodes in the set LSR1-LSR5. In particular, when communicating the new set of tunnels to be rerouted, the PCE also adds a new TLV listing the set of LSRs having at least one tunnel to be rerouted in order to move the network to the new state s=1, as mentioned above. At this point, each LSR starts to send keepalive messages (e.g., at a fast pace) as shown in FIG. 6 (keepalives 650, from the perspective of LSR1) to each LSR listed in the set of LSRs impacted by the operation of rerouting, and/or to the PCE in order to quickly detect a failure of either the PCE, or an LSR involved in moving the network to the new state s=1. That is, by maintaining a keepalive protocol between the router and the PCE, as well as (or alternatively) with one or more other routers involved in the optimization, each router can determine "PCE failure" in response to breakdown of the keepalive protocol, either with the PCE or with any one of the one or more other routers. Notably, once a router has successfully completed the rerouting operation, it may send an explicit unicast message to each LSR in the set LSR1-LSR5.

In this second mode of operation, if a router detects a failure of the PCE or PCC-PCE communication, or detects that one of the nodes in the set is no longer alive, it may inform its peers in the set that the operation should be aborted, in which case, all nodes in the set fall back to s=0 (e.g., the ERO_OLD) for their tunnels. Otherwise, once an LSR has received a positive acknowledgement from each of its peers reporting a successful reroute of its impacted tunnels, then the network has successfully moved to the state s=1 and all original tunnel states (e.g., ERO_OLD) may be flushed from memory.

Note that in a specific embodiments herein, the PCE may direct the LSRs to remain at the optimized state even if there is a PCE failure prior to completion of the optimization. In particular, when transitioning from s=0 to s=1, if a timer to achieve s=1 is nearly complete, and it appears that s=1 cannot be reached due to the PCE failure, this specific embodiment allows the PCE(s) to tell the LSRs that the current state is an improvement over s=0, and may thus remain there (pending further instructions). In a first mode, the PCE specifically informs the LSRs to remain in their transitioned state, while in a second mode, routers may initiate a timer when starting their reroutes (e.g., a timer received from the PCE), where the timer is less than a time required to complete the optimization. In this second mode, the routers would revert to the original state of their tunnels only when PCE failure occurs prior to expiration of the timer.

Figure 7:
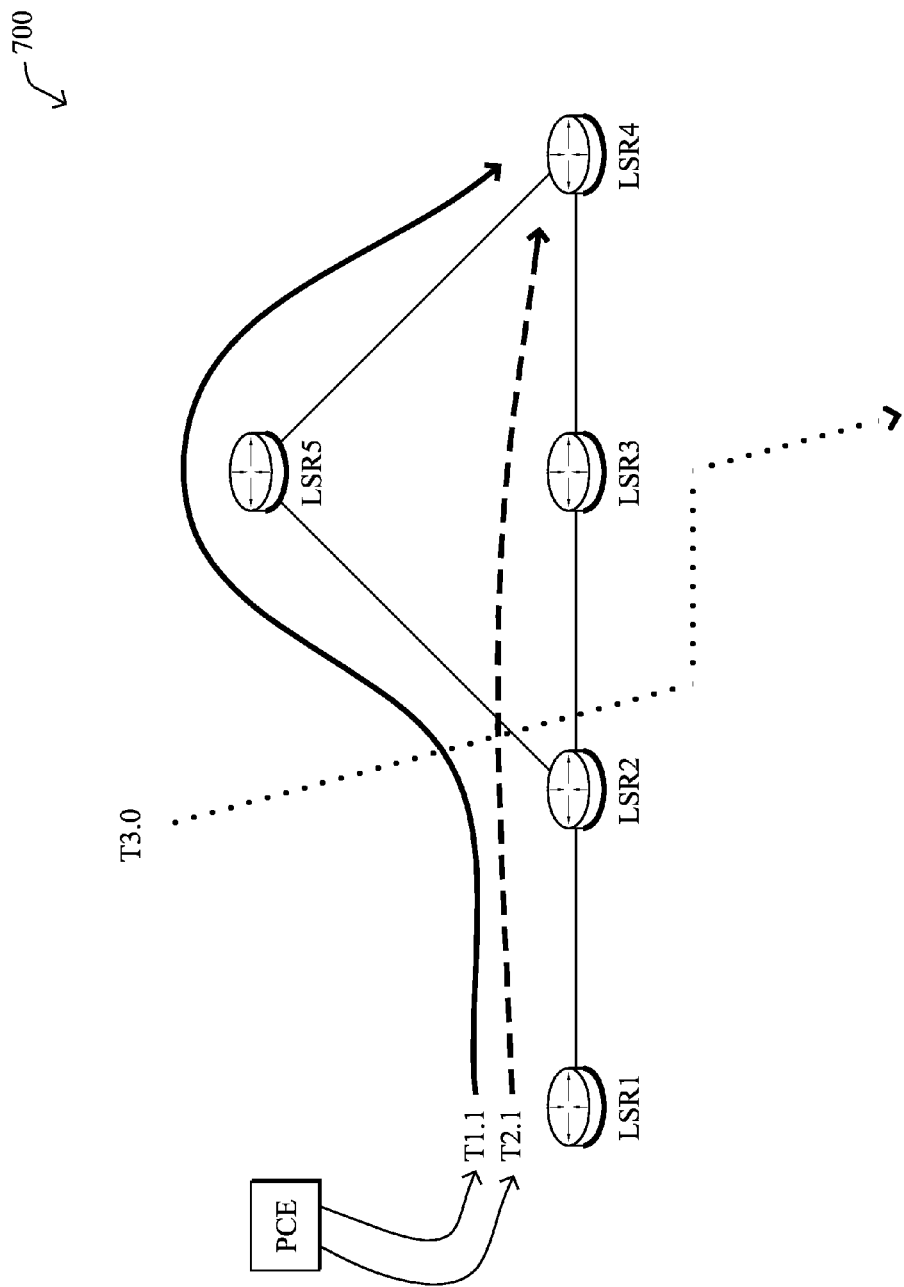
FIG. 7 illustrates another example of tunnel states during a reoptimization process.

As an example of this specific embodiment, FIG. 7 illustrates the addition of a third tunnel, T3, which has not yet been optimized (state s=0, i.e., T3.0). Since T1 and T2 have been rerouted already, if there is a failure of the PCE (e.g., the optimization operation), it may be desirable to keep T1.1 and T2.1, rather than revert. Accordingly, the two modes above provide for either an explicit notice from the PCE to maintain the updated state, or a timer upon which the devices may simply prevent reversion (e.g., 90% completed optimization may be better than the original state).

Figure 8:
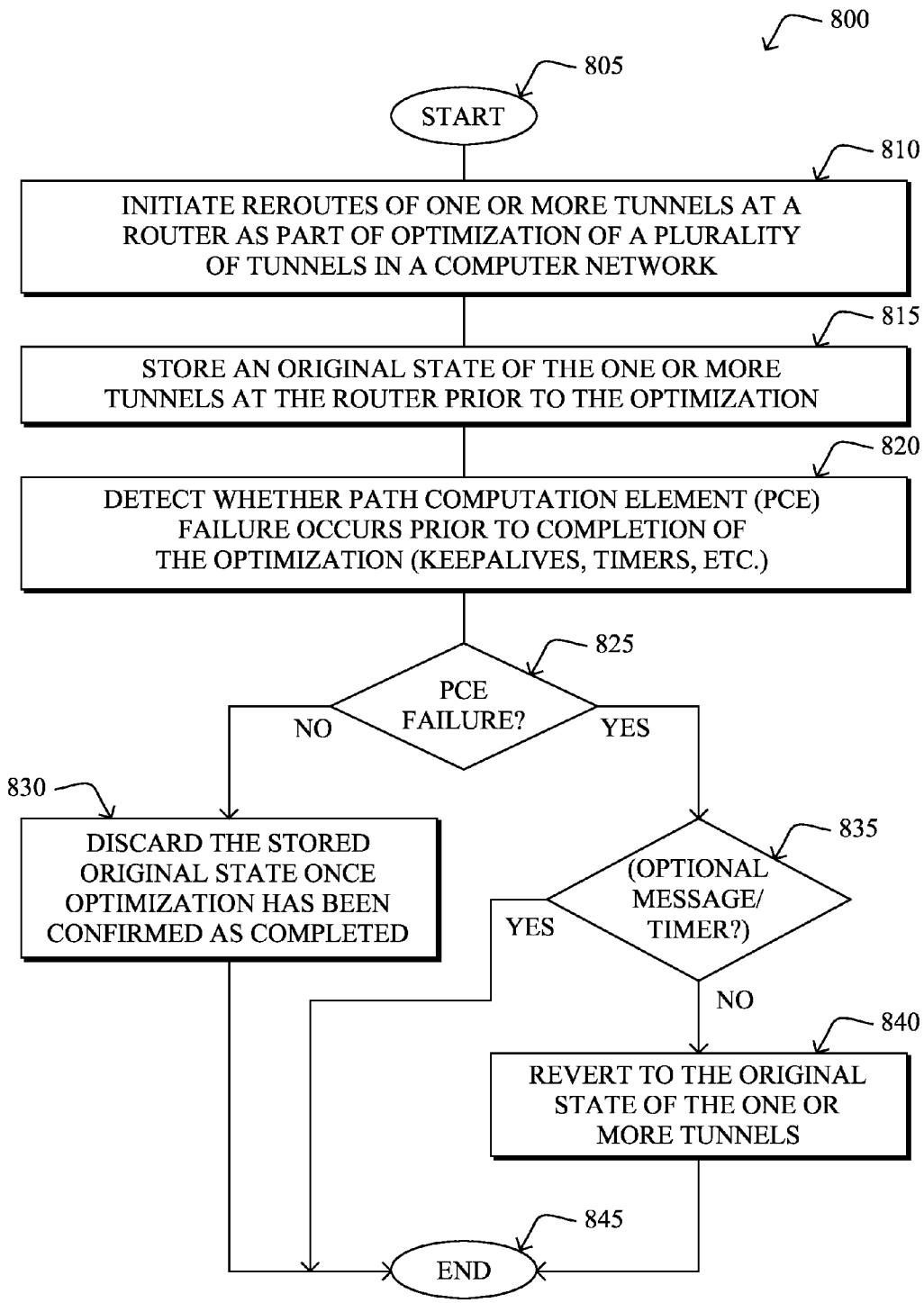
FIG. 8 illustrates an example simplified procedure for global state resynchronization for PCE failure during a reoptimization process.

FIG. 8 illustrates an example simplified procedure 800 for global state resynchronization for PCE failure during a reoptimization process in accordance with one or more embodiments described herein. The procedure 800 may start at step 805, and continues to step 810, where, as described in greater detail above, a router (e.g., LSR) initiates reroutes of one or more tunnels at the router as part of PCE-based (re)optimization of a plurality of tunnels in a computer network. As part of the initiation, the router also stores an original state of the one or more tunnels prior to the optimization in step 815. During the optimization, the router may detect, in step 820, whether PCE failure occurs prior to completion of the optimization, such as based on keepalives, timers, etc., as described above. If there is no PCE failure by step 825, then in step 830 the router may discard the stored original state once optimization has been confirmed as completed. However, if there is a detected PCE failure in step 825, then optionally in step 835 the router may also determine whether the optional explicit message was received (to prevent reversion) or else whether the threshold timer has passed, that is, whether the optimization has progressed adequately. If not received/elapsed, then in step 840 the router reverts to the original state of the one or more tunnels in response to PCE failure as detailed above. The procedure 800 illustratively ends in step 845.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for global state resynchronization for PCE failure during a reoptimization process. In particular, the techniques herein address the critical problem of failure of LSR (PCC), of LSR-PCE communication, or of the stateful PCE during a reroute of a number of tunnels, which has been identified as a major issue in these architectures. According to the techniques herein, should such an event take place, the network may automatically fall back to a previous state, thus avoiding having it left in a very unstable (and unknown) state.

While there have been shown and described illustrative embodiments that provide enhanced operation for stateful PCE architectures, it is to be understood that various other adaptations and modifications may be made within the spirit and scope of the embodiments herein. For example, the embodiments have been shown and described herein with relation to MPLS TE-LSPs and other various protocols. However, the embodiments in their broader sense are not as limited, and may, in fact, be used with any function for which a PCE may be responsible, such as other types of tunnels, other types of path computation, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    initiating reroutes of one or more tunnels at a router as part of optimization of a plurality of tunnels in a computer network;
    in response to initiating reroutes of the one or more tunnels, storing an original state of each of the one or more tunnels being rerouted at the router prior to the optimization;
    detecting whether path computation element (PCE) failure occurs prior to completion of the optimization; and
    in response to PCE failure prior to completion of the optimization, reverting to the original state of the one or more tunnels,
        wherein detecting whether PCE failure occurs comprises:
            maintaining a keepalive protocol between the router and the PCE, and
            determining PCE failure in response to breakdown of the keepalive protocol.

2. The method as in claim 1, wherein PCE failure is due to at least one of: the PCE device failing; communication between the router and the PCE failing; and inability of the router to comply with PCE instruction for the optimization.

3. The method as in claim 1, wherein detecting whether PCE failure occurs comprises:
    initiating a timer upon initiating the reroutes;
    determining whether the optimization has completed during the timer; and
    determining PCE failure upon expiration of the timer without having yet determined that optimization has completed.

4. The method as in claim 1, wherein detecting whether PCE failure occurs comprises:
    maintaining a keepalive protocol between the router and one or more other routers involved in the optimization; and
    determining PCE failure in response to breakdown of the keepalive protocol with any one of the one or more other routers.

5. The method as in claim 1, further comprising:
    discarding the stored original state once optimization has been confirmed as completed.

6. The method as in claim 1, further comprising:
    initiating a timer upon initiating the reroutes, wherein the timer is less than a time required to complete the optimization; and
    reverting to the original state of the one or more tunnels in response to PCE failure prior to completion of the optimization only when prior to expiration of the timer.

7. The method as in claim 6, further comprising:
    receiving the timer from the PCE as part of the optimization.

8. The method as in claim 1, further comprising:
    receiving an explicit message from the PCE to prevent reverting to the original state of the one or more tunnels regardless of PCE failure prior to completion of the optimization.

9. An apparatus, comprising:
    one or more network interfaces to communicate as a router within a computer network;
    a processor coupled to the network interfaces and adapted to execute one or more processes; and
    a memory configured to store a process executable by the processor, the process when executed operable to:
        initiate reroutes of one or more tunnels at the router as part of optimization of a plurality of tunnels in a computer network;
        store an original state of each of the one or more tunnels being reroute at the router prior to the optimization in response to initiating reroute of the one or more tunnels;
        detect whether path computation element (PCE) failure occurs prior to completion of the optimization; and
        in response to PCE failure prior to completion of the optimization, revert to the original state of the one or more tunnels,
        wherein the process when executed is further operable to detection whether PCE failure occurs by:
            maintaining a keepalive protocol between the router and the PCE, and
            determining PCE failure in response to breakdown of the keepalive protocol.

10. The apparatus as in claim 9, wherein PCE failure is due to at least one of: the PCE device failing; communication between the router and the PCE failing; and inability of the router to comply with PCE instruction for the optimization.

11. The apparatus as in claim 9, wherein the process when executed to detect whether PCE failure occurs is further operable to:
    initiate a timer upon initiating the reroutes;
    determine whether the optimization has completed during the timer; and
    determine PCE failure upon expiration of the timer without having yet determined that optimization has completed.

12. The apparatus as in claim 9, wherein the process when executed to detect whether PCE failure occurs is further operable to:
    maintain a keepalive protocol between the router and one or more other routers involved in the optimization; and
    determine PCE failure in response to breakdown of the keepalive protocol with any one of the one or more other routers.

13. The apparatus as in claim 9, wherein the process when executed is further operable to:
    discard the stored original state once optimization has been confirmed as completed.

14. The apparatus as in claim 9, wherein the process when executed is further operable to:
    initiate a timer upon initiating the reroutes, wherein the timer is less than a time required to complete the optimization; and revert to the original state of the one or more tunnels in response to PCE failure prior to completion of the optimization only when prior to expiration of the timer.

15. The apparatus as in claim 14, wherein the process when executed is further operable to:
receive the timer from the PCE as part of the optimization.

16. The apparatus as in claim 9, wherein the process when executed is further operable to:
receive an explicit message from the PCE to prevent reverting to the original state of the one or more tunnels regardless of PCE failure prior to completion of the optimization.

17. A tangible, non-transitory, computer-readable media having software encoded thereon, the software, when executed by a processor on a router, operable to:
initiate reroutes of one or more tunnels at the router as part of optimization of a plurality of tunnels in a computer network;
store an original state of each of the one or more tunnels being rerouted at the router prior to the optimization in response to initiating reroute of the one or more tunnels;
detect whether path computation element (PCE) failure occurs prior to completion of the optimization; and
in response to PCE failure prior to completion of the optimization, revert to the original state of the one or more tunnels,
wherein detection whether PCE failure occurs includes:
maintaining a keepalive protocol between the router and the PCE; and
determining PCE failure in response to breakdown of the keepalive protocol.

18. The computer-readable media as in claim 17, wherein the software when executed to detect whether PCE failure occurs is further operable to:
determine PCE failure based on one of either expiration of a timer without having yet determined that optimization has completed or breakdown of a keepalive protocol between the router and either the PCE or other routers involved in the optimization.

* * * * *

UNITED STATES PATENT AND TRADEMARK OFFICE
CERTIFICATE OF CORRECTION

PATENT NO. : 9,077,615 B2  
APPLICATION NO. : 13/524632  
DATED : July 7, 2015  
INVENTOR(S) : Vasseur et al.

Page 1 of 1

It is certified that error appears in the above-identified patent and that said Letters Patent is hereby corrected as shown below:

In the specification

In column 10, line 20, please replace:
"aut0-bandwidth" with "auto-bandwidth"

Signed and Sealed this
Tenth Day of November, 2015

Michelle K. Lee
*Director of the United States Patent and Trademark Office*